United States Patent Office 3,417,069
Patented Dec. 17, 1968

3,417,069
POLYHALOGENOUS EPOXY COPOLYMERS
Pauls Davis, Gibraltar, and Herwart C. Vogt, Grosse Ile, Mich., assignors to Wyandotte Chemical Corporation, Wyandotte, Mich., a corporation of Michigan
No Drawing. Filed Oct. 10, 1963, Ser. No. 315,353
The portion of the term of the patent subsequent to Oct. 24, 1984, has been disclaimed
35 Claims. (Cl. 260—92.3)

ABSTRACT OF THE DISCLOSURE

An epoxy copolymer formed by reacting a copolymer of an alkylene oxide, containing three to four carbon atoms, inclusive, with an ethylenically-unsaturated compound having a plurality of polymerizable carbon-to-carbon double bonds, and subsequently reacting the product with an epoxidizing agent to cause at least some of the double bonds to be converted to pendant epoxy groups, the resulting compound being curable with standard epoxy curing agents.

---

The present invention relates to copolymers, and is more particularly concerned with polyhalogenous epoxy copolymers which may be cured to produce various useful resinous products having resistance to chemical action and to fire.

Epoxy resins are well known in the art. The most common general purpose epoxy resins are derivatives of bisphenol A and epichlorohydrin, and have the following general formula:

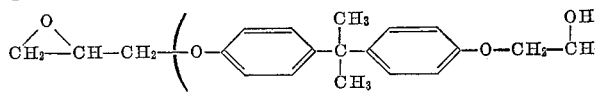

wherein $n$ is an integer including zero.

More recently epoxy resins have been developed which are produced by the epoxidation of polybutadiene, for example, as disclosed in U.S. Patents 2,826,556, 2,829,130, 2,829,131, 2,829,135, and 2,833,747. However, the epoxy resins of the prior art are highly flammable and cannot be used for applications requiring a degree of fire resistance.

It is an object of the present invention to provide a novel and useful class of polyhalogenous copolymers. It is an additional object to provide a novel class of polyhalogenous copolymers which combine the desirable properties of epoxy resins with those of polyhalogenous copolymers. It is a further object to provide a novel class of polyhalogenous epoxy copolymres which may be cured to form compositions which are relatively infusible and insoluble in organic liquids, and which exhibit improved chemical and fire resistance. It is still further an object to provide a method for the preparation and curing of said polyhalogenous copolymers. Additional objects will be apparent to one skilled in the art and still other objects will become apparent hereinafter.

It has now been found that the foregoing and additional objects are accomplished by first copolymerizing a polyhalogenous alkylene oxide with an ethylenically-unsaturated compound having at least two copolymerizable carbon-to-carbon double bonds, and subsequently epoxidizing at least some of the curing ethylenically unsaturated groups of the resulting copolymer. The composition thus formed containing epoxy groups may then be cured by means of curing agents normally used for curing traditional epoxy resins.

POLYHALOGENOUS ALKYLENE OXIDES

The polyhalogenous alkylene oxides which are employed as starting materials to prepare the copolymers of the invention are vicinal alkylene oxides containing from three to four carbon atoms, and having attached to a carbon atom of the oxirane ring an alkyl group having up to two carbon atoms and containing at least two and preferably three halogen atoms attached to the terminal carbon atom. Additionally, when the alkyl group contains two carbon atoms, the second carbon atom may also contain halogen substituents. The term "oxirane ring" refers to a three-membered cyclic ether group represented by the formula:

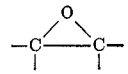

wherein the ether oxygen is bonded to adjacent carbon atoms. Representative of such polyhalogenous alkylene oxides are 1,1-dichloro-2,3-epoxypropane, 1,1,1-trichloro-2,3-epoxypropane, 1,1,1-trifluoro-2,3-epoxypropane, 1-bromo-1,1-dichloro-2,3-epoxypropane, 1,1-dichloro-1-fluoro-2,3-epoxypropane, 1,1-difluoro-1-chloro-2,3-epoxypropane, other mixed 1,1,1-trihalo-2,3-epoxypropanes, 1,1,1-tribromo-3,4-epoxybutane, 1,1,1-trichloro-3,4-epoxybutane, 1,1-dichloro-3,4-epoxybutane, 1,1,1,2,2-pentachloro-3,4-epoxybutane, 1,1,1,4,4-pentachloro-2,3-epoxybutane, 1,1,1,2,2-pentafluoro-3,4-epoxybutane, 1,1,1,2,2-mixed pentahalo-3,4-epoxybutane, etc. As is obvious from these examples the halogens bonded to these polyhalogenated alkylene oxides, and consequently to the pendant polyhalogenoalkyl groups of the polyhalogenous copolymers, may be any halogen or mixture of halogens. Of the halogens, those having atomic weights of 19 to 80, including fluorine, chlorine, and bromine, are preferred. Preferably, all three of the substitutable valences of the terminal carbon atom of the polyhaloalkyl group are satisfied by halogen atoms.

The polyhalogenous epoxypropanes used in the present invention for the preparation of polyhalogenous polyhydroxy copolymers may be prepared by known methods such as by the dehydrohalogenation of the appropriate polyhalogenated secondary alcohol in sodium hydroxide solution. For example 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The propanol used in the process may in turn be prepared in known manner by the reduction of the appropriate halogenated acetone with aluminum isopropoxide in isopropanol.

The 1-polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462. 1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the polyhalogenous alkylene oxides react, the oxirane ring is opened with the breaking of an oxygen bond to form a bivalent radical wherein the members of the oxirane group form a bivalent linear chain having the polyhalogenous lower-alkyl group, originally attached to a carbon atom of the oxirane ring, as an extra-linear substituent. The bivalent oxyalkylene radical may be bonded through each valence to a carbon atom of the ethylenic group of the ethylenically unsaturated compound with which the alkylene oxide copolymerizes.

In general, it has been found that the copolymers should have a halogen content of at least 45% by weight where they are to be used as intermediates in the preparation of more complex compositions such as more complex copolymers or compounded rubbers having improved fire resistance.

ETHYLENICALLY-UNSATURATED COMPOUND

The compounds which may be used in the present invention for copolymerization with the polyhalogenous alkylene oxides are the ethylenically-unsaturated compounds containing at least two co-polymerizable carbon-to-carbon double bonds. Among such compounds are butadiene, isoprene, chloroprene, furane and divinyl benzene. Other suitable materials are cyclopentadiene, bicyclopentadiene and sorbic acid and derivatives thereof.

CATALYST

A variety of catalysts may be employed to effect the reaction of the alkylene oxide with the ethylenically-unsaturated compound. The catalysts include those of the Friedel-Crafts type such as boron trifluoride, ferric chloride, anhydrous aluminum trichloride, zinc chloride, stannic chloride, antimony trifluoride, and complexes of these catalysts, such as boron trifluoride etherates, etc.; acid type catalysts such as hydrofluoric acid, acid fluoride salts such as potassium acid fluoride, fluoboric acid, fluosilicic acid, fluoplumbic acid, perchloric acid, sulfuric acid, phosphoric acid, etc.; other catalysts such as antimony pentachloride, alkoxides and alcoholates of aluminum, etc. The preferred catalysts are of the Lewis acid type, including the aforesaid Friedel-Crafts and acid types, and especially boron trifluoride and phosphorus pentafluoride.

The amount of catalyst to be used depends on the compound used as catalyst and upon the reaction conditions. Amounts of catalyst up to 10% by weight based on the amount of reactants may be used, with smaller amounts, e.g., up to 2% or 3%, being generally satisfactory and economically preferred. For example, when boron trifluoride is used as the catalyst, good results are obtained with amounts ranging from a few hundredths of 1% to 5%, the preferred range being about 0.17% to about 0.5% based on the total quantities of reactants. When small amounts of catalyst are used, the rate of reaction is generally slower and it may be necessary to use higher reaction temperatures.

SOLVENT

The reaction for the production of the copolymer is preferably carried out in the presence of an organic solvent. It has been found that, in order to obtain the desired product in good yield, polar solvents should be used, although non-polar solvents may be used where reduced yields can be tolerated. Among the suitable solvents are the cellosolves, as for example butylcellosolve (2-butoxyethanol), and other polar solvents such as methylene chloride, methyl chloride, chloroform, and other similar materials.

The temperature at which the reaction is carried out is determined largely by the choice of solvent. When low-boiling solvents such as methylene chloride are used, it is convenient to carry out the reaction at the boiling point of the solvent under reflux conditions.

EPOXIDATION

The epoxidized copolymers of the present invention are prepared by reacting the copolymer of a polyhalogenous alkylene oxide and an ethylenically-unsaturated compound having a plurality of carbon-carbon double bonds, prepared as described above, with an epoxidizing agent. As a result, at least some of the pendant double bond-containing groups are converted to epoxy groups, the degree of conversion being dependent upon the degree to which the reaction is continued and upon the reactivity of the particular epoxidizing agent used. Among the suitable epoxidizing agents are the following: hydrogen peroxide, organic peracids, metal-activated hydrogen peroxides (such as those formed by the use of osmic acid and tungstic acid), and alkaline hydrogen peroxides.

The peracid systems used as epoxidizing agents involving $H_2O_2$ may be further classified as:

(a) preformed acid
(b) acid formed in situ

Peracetic acid may also be prepared by the autoxidation of acetaldehyde. Other organic peracids which may be used in the preparation of oxirane-containing material from olefinic compounds are:

(1) perbenzoic acid
(2) monoperphthalic acid
(3) peroxytrifluoroacetic acid
(4) metachloroperbenzoic acid Peracetic acid is commercially available. It can be readily formed by mixing 1.6 moles of glacial acetic acid with 1 mole of 90% hydrogen peroxide in the presence of about 2–3% sulfuric acid. Acetic anhydride may also be added to displace the equilibrium by removing water. The catalyst may be a cation exchange resin, such as poly (styrenesulfonic acid) resin in the acid form.

When hydrogen peroxide is used as the basic peroxide, the reaction involves two stages. In the first stage, the hydrogen peroxide is mixed with an organic acid, as for example, acetic acid, to form an equilibrium containing peracetic acid:

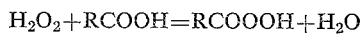

$$H_2O_2 + RCOOH = RCOOOH + H_2O$$

In the second stage the peracetic acid is reacted with an olefinic double bond of the copolymer to from the epoxide:

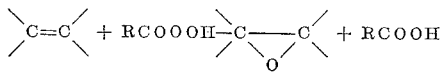

In addition to the primary reaction, side reactions may take place and may even predominate if not carefully controlled, such as the formation of hydroxyacyloxy and glycol derivatives by further cleavage of the epoxy ring:

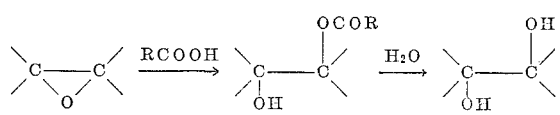

The side reactions may be controlled by careful selection of reaction temperature and other conditions, as is well known in the art for such type reactions.

CURING OF CHLOROEPOXY RESIN

The present polyhalogenous epoxy copolymers have a number of curing degrees of freedom, due to the various reactive sites along the polymer chain. Pendant epoxy or oxirane groups are located along the polyether chain. Consequently, they react readily with traditional epoxy curing agents such as anhydrides, dibasic acids and polyfunctional amines. As a result of a certain amount of hydrolysis of the epoxy groups during the preparation and isolation of the polychloroepoxy resin, hydroxyl groups are also present and can provide initial reactivity. Additionally, in some types of compounds there is also a certain amount of epoxy-hydroxyl group interaction. The polychloroepoxy resins retain some double bonds and consequently can also be cured with the usual peroxide catalysts. Such curing may be accomplished by the addition of a peroxide, either alone or in combination with other curing agents such as anhydrides.

As in the case of the simple alkylene oxide monomers, any group or radical which is capable of reacting with the oxirane oxygen and cause homopolymerization to a polyether polymer is also capable of initiating crosslinking of an epoxy resin. This makes available an additional curing degree of freedom. The epoxy group may be readily opened by available ions and active hydrogen compounds. The initiating compound converts the hydroxyl group arising from the epoxy group to an alkoxide ion, which reacts with another epoxy group to create a new alkoxide ion. This combines with another molecule or epoxide group, forming an ether linkage, and regenerating the alkoxide ion to combine with still another epoxide molecule, and so the chain goes on. Boron trifluoride and boron trifluoride complexes, as well as strong acids or bases, may be used to initiate this reaction.

Other types of curing systems such as those using polyphenols, Lewis-type catalysts, poly-mercaptans, polysulfides, polyether, polyols, and others may also be used.

The cured plastics prepared by these methods are highly crosslinked resins with improved physical properties, such as low mechanical distortion at elevated temperatures and high flexural strength, fire resistance, and good electrical properties.

The epoxidized copolymers of the present invention may be cured with the large variety of curing agents which are suitable for curing bisphenol A-epichlorohydrin epoxy resins. In general, any compound capable of reacting with an oxirane group may be employed as the hardening or curing agent. However, the time of cure, exotherms, toxicity, degree of crosslinking, color, tensile strength, heat distortion, hardness, etc., all depend, to some degree, on the type of catalyst or curing or hardening system employed. Consequently, the proper curing agent may be selected to provide cured resins having the properties desired.

The two general types of curing agents suitable for curing epoxy resins are the amines and the anhydrides. Primary and secondary aliphatic amines such as ethylenediamine, diethylenetriamine, triethylenetetramine, and tetraethylenepentamine are suitable. Hydroxy-aliphatic amines may also be used such as N-(hydroxyethyl)diethylenetriamine, N,N'-bis(hydroxyethyl)diethylenetriamine, and N-(2-hydroxypropyl)ethylenediamine. Acrylonitrile-amine adducts such as cyanoethyl diethylenetriamine may also be used. Other suitable aromatic diamines may also be used such as m-xylylenediamine, m-phenylenediamine, diaminodiphenyl sulfone and 4,4'-methylenedianiline. Other suitable compounds are aliphatic primary-tertiary amines such as diethylaminopropylamine and dimethylaminopropylamine, piperidine, phenolic tertiary amines such as dimethylaminomethylphenol, tri(methylaminomethyl)phenol, 2-ethyl hexoic salt of tri(dimethylaminomethyl)phenol, and dicyandiamide.

Among the suitable acid anhydrides are phthalic anhydride, pyromellitic dianhydride, maleic anhydride, chorendic anhydride, dodecylsuccinic anhydride, and hexahydrophthalic anhydride.

Unmodified cured epoxy resins sometimes tend to be brittle. To improve tensile properties, as well as other physical properties, various modifiers may be incorporated into the resin. Among the suitable modifiers are liquid polysulfide rubbers which are capable of linking two diepoxide molecules together, forming a much longer diepoxide with a flexible middle section. "Versamid" resins (General Mills, Inc.), comprising mixtures of polyamides and amine-containing polymers, may be used in much the same manner as the polysulfide rubbers. Aliphatic epoxides or selected amines may also be used for this purpose.

A variey of inert solid materials may be added to the present epoxy resins to further improve the properties of the cured material. Reinforcing fibers may be used in the form of cloth, mat, or chopped strands or staple. The fibers may be mineral (glass, asbestos), vegetable (sisal, cotton), synthetic (Orlon, nylon), or metallic. Fillers in the form of inorganic particles may also be added to improve heat resistance, shrinkage or curing, and thermal expansion coefficient.

Among the various uses for the present epoxy resins are in coatings (solution type, 100% solids, or ester type), plastic tooling, potting and encapsulation, adhesives, laminates (fiberglass reinforced epoxies), and many others. The resins may be used for encapsulation of electrical and electronic components as they react readily with anhydrides used in curing the composition, and they combine excellent electrical properties with elevated-temperature stability.

The present polyhaloepoxy resins may be prepared in a wide range of viscosities. In addition, viscosity may be modified by use of reactive epoxy diluents or vinyl monomers to give cured resins with low shrinkage and low exotherms. The ability to cure at low temperatures and the possibility of a wide choice of curing systems make the polyhaloepoxy resins ideally suited for castings and tooling.

The polyhaloepoxy resins react slowly with polyamines at room temperature, but readily react at elevated temperatures. They also wet glass well and show good adhesion when cured. They also may be cured under low pressure with relatively short time cycles. These properties are of particular interest in the manufacture of laminates for structural applications, for tooling, for plastic pipe, etc.

Excellent adhesion to many types of surfaces may also be obtained by the use of the polyhaloepoxy resins. The presence of multiple functional groups within the molecular structure (trihalomethyl, epoxy, hydroxyl, and ether) together with each great variety of curing systems which may be available for these resins, render them suitable for many adhesive applications.

The polyhaloepoxy resins may be reacted with phenol formaldehyde resins as well as with polyhydric phenols to provide products suitable for many adhesive applications.

The polyhaloepoxy resins may also be used for protective coating applications. They may be used alone, in conjunction with phenol formaldehyde and nitrogen resins, such as nitrile rubbers and polyamides, or may be converted to resin esters.

Since the polyhaloepoxy polymers contain epoxy groups and vinyl double bonds, they have the capability of acting as hydrogen chloride acceptors. This renders them suitable for application as stabilizers for chlorinated materials. Selected members of the present polymer system may be emulsified in water.

The following examples are given by way of illustration only and are not to be construed as limiting.

All experiments described in the examples which follow were carried out in standard laboratory glassware.

The batch preparation of 1,1,1-trichloro-2,3-epoxypropane/butadine copolymers were carried out in a two-liter, jacketed resin kettle, equipped with a Dry Ice condenser, nitrogen sparger, stirrer, thermocouple, and an inlet for introducing the catalyst above the reaction medium. The jacketed resin flask was cooled by circulating cold methanol. The methanol was cooled in a Dry Ice-acetone bath, the temperature of which was automatically controlled from the temperature recorder. The $BF_3$ gas was metered by displacing $CCl_4$ from a calibrated flask.

The continuous copolymerization of 1,1,1-trichloro-2,3-epoxypropane and butadiene was conducted in a 120 cm. glass-jacketed tube reactor, fitted with a condenser to cool the refrigerant liquids used for the reactor. The solutions containing the monomers and catalyst were forced by nitrogen pressure from an ice-cooled storage flask in polyethylene tubing through two calibrated Fischer and Porter precision bore glass flowraters into a 20 cm. long jacketed mixing tube maintained at ca. <60° C. The reaction mixture was then passed into the reactor tube, the temperature being maintained by the type of refrigerant liquids used (dichlorodifluoromethane −29.8°

C.; 1,2-dichloro-1,1,2,2-tetrafluoroethane +4.1° C., trichlorofluoromethane +23.7° C.). The tube was tilted up ca. 3° from level to insure constant flow rate of the solutions through the reactor. The solution was pumped through an ice bath into a graduated cylinder. The jacketed mixing tube was cooled with circulating methanol cooled with Dry Ice-acetone mixture.

The molecular weights were determined in a modified Cottrel ebullimetric apparatus. The temperature was measured with a Beckmann differential thermometer.

The following examples illustrate the preparation of copolymers of 1,1,1-trichloro-2,3-epoxypropane with isoprene. The reaction may be illustrated by the following equation:

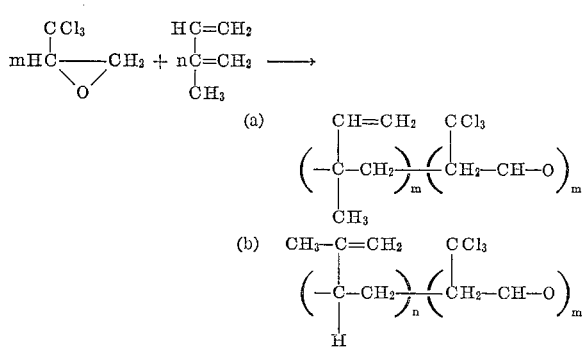

The resultant product is a polymeric polyether chain having both pendant halogen-containing groups and pendant vinyl groups. Generally mixtures of several possible isomers are formed (head-to-head, head-to-tail, tail-to-tail, and mixtures thereof).

Example 1

A mixture was prepared containing 1 mole of 1,1,1-trichloro-2,3-epoxypropane and 1 mole of isoprene in methylene chloride. Gaseous $BF_3$ was added. The threshold concentration required to initiate polymerization was 0.009 mole of $BF_3$. However, a total of 0.03 mole was added in order to increase the rate of reaction. After initiation, polymerization proceeded at a very rapid rate, the reaction being complete within approximately three minutes. The product was isolated and purified by precipitation in methanol. The yield of converted monomers to polymer was nearly quantitative. The methanol-insoluble product was a colorless amorphous free-flowing powder non-tacky at room temperature.

Example 2

The reaction described in Example 1 was repeated utilizing a molar ratio of 1,1,1-trichloro-2,3-expoxypropane to isoprene of 2:1.4. The conversion dropped to 70%. The polymeric product was a hard, track-free product. X-ray analysis indicated a very low percentage of crystallinity (less than 5%).

Example 3

A 1,1,1-trichloro-2,3-epoxypropane/isoprene copolymer having a 1:1.1 molar ratio was prepared as in Example 1 above. The product was a white, amorphous solid, becoming tacky at 90–93° C., and fusing at 105–110° C. The product showed slight yellowing at a temperature above 225° C. and started to decompose with gas evolution at 265° C., turning yellow-brown. The molecular weight, determined by boiling point elevation in benzene, was 1,246.

The following example illustrates the preparation of a copolymer of 1,1,1-trichloro-2,3-epoxypropane and butadiene. The reaction may be illustrated as follows:

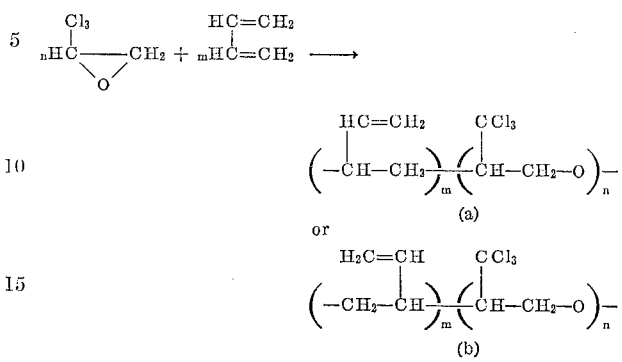

Generally a mixture of about 60% head-to-tail polymerization (a) and 40% head-to-head polymerization (b) is obtained, plus some 1,4-addition product.

Example 4

Copolymerization of 1,1,1-trichloro-2,3-epoxypropane with butadiene-2:1 molar ratio.—In a two-liter jacketed resin kettle, 1.5 liters of methylene chloride and 486 g. (3 moles) of 1,1,1-trichloro-2,3-epoxypropane were mixed and the solution cooled to $-30°$ C. before 81 g. (1.5 mole) of butadiene were added. To the clear, vigorously stirred solution, 1.5 liters (0.055 mole) of $BF_3$ gas were introduced above the reaction mixture. The initiation of the reaction was manifested by a 30° C. temperature exotherm which, after approximately three minutes, had reached a maximum of about 0° C. The mixture was cooled to $-30°$ C. and transferred to a round-bottom flask and the catalyst complex killed with gaseous dry ammonia. The amount of ammonia used was measured by a color change of the solution from light orange to pale yellow. There were no temperature changes observed. The polymerization was repeated using identical concentrations and conditions, and the two solutions combined.

Twenty-five grams of $NaHCO_3$ as a buffer were added to the methylene chloride-polymer solution and the mixture steam distilled. The first fraction to distill over was methylene chloride, followed by an azetropic mixture of 1,1,1-trichloro-2,3-epoxypropane and water. At the completion of the distillation, the pale yellow, free-flowing polymer was washed with cold water several times to remove the last traces of salts. Yield of isolated polymer based on the two polymerizations was 89% (1005 g.). The polymer has a molecular weight by boiling point elevation of 1175, a 56.5% chlorine content (theoretical is 56.4%), a 44° C. softening point, a hydroxyl number by isocyanate technique of 1.03%, a density of 1.588 at 23.5° C., and a dilute solution viscosity (DSV)=0.04.

A 50 g. sample of the copolymer was dissolved in 450 ml. of anhydrous acetone and 50 ml. of water were added with stirring, causing a fraction of the soluble polymer to oil out. The soluble and insoluble fractions were separated and isolated by vacuum stripping. The insoluble fraction had 56.3% chlorine while the acetone-water fraction had 58.1% chlorine.

Table I which follows lists the results of experiments performed by reacting 1,1-dichloro-2,3-epoxypropane and 1,1,1-trichloro-2,3-epoxypropane with butadiene in varying proportions utilizing various catalysts and solvents. For convenience, 1,1-dichloro-2,3-epoxypropane is designated as DCPO and 1,1,1-trichloro-2,3-epoxypropane as TCPO. Parts by weight of each monomer is indicated by the numeral which immediately follows its designation. The molecular weight of the copolymer is indicated as M.W.

TABLE I

| Example | Monomer | | Solvent | Catalyst | Percent Cl | MW | Percent Conversion |
|---|---|---|---|---|---|---|---|
| 5 | TCPO, 1 | Butadiene, 2 | $CH_2Cl_2$ | $BF_3$ | 38.9 | 851 | 87 |
| 6 | TCPO, 1 | Butadiene, 1 | $CHCl_3$ | $BF_3$ | 50.2 | 712 | 84 |
| 7 | DCPO, 1 | do | $CH_2Cl_2$ | $BF_3$ | | 1,211 | 81 |
| 8 | TCPO, 1 | do | $CH_2Cl_2$ | $BF_3$ | | 1,115 | 92 |
| 9 | TCPO, 1 | do | $CH_2Cl_2$ | $SbCl_5$ | | | 3 |
| 10 | TCPO, 1 | do | $CH_3Cl$ | $BF_3$ | | 1,312 | 89 |
| 11 | TCPO, 2 | do | $CH_2Dl_2$ | $BF_3$ | 49.3 | | 97 |

In Table II which follows are listed results of experiments which were carried out to determine the effect of varying the monomer ratios on the physical and chemical properties of the resulting copolymer. The reactions were carried out in methylene chloride using $BF_3$ as a catalyst. The reaction was carried out at a temperature of −30° C. The various molar ratios of monomer utilized are listed, together with the percent yield, molecular weight, chlorine content, and density of the final product. For convenience 1,1,1-trichloro-2,3-epoxypropane is designated as TCPO, and butadiene is designated as BD.

The data in the Table indicate that optimum conversion of monomer to polymer was achieved at ratios of 2:1, 1:1, and 1:2. The molecular weight, as determined by the boiling point elevation, increased as the copolymer became richer in butadiene. The increase in butadiene also resulted in a decrease in the density of the copolymer, since the density appears to be directly proportional to the chlorine concentration.

TABLE II

| Ex. | TCPO/BD, Molar Ratio | Percent Yield | Molecular Weight | Percent Chlorine | | Density |
|---|---|---|---|---|---|---|
| | | | | Calc. | Determined | |
| 12 | 3:1 | 75 | 1,734 | 59.3 | 58.7 | 1.640 |
| 13 | 2:1 | 89 | 1,175 | 56.4 | 56.7 | 1.588 |
| 14 | 1:1 | 89 | 1,296 | 49.4 | 47.5 | 1.557 |
| 15 | 1:2 | 93 | 1,610 | 39.5 | 39.7 | 1.424 |
| 16 | 1:3 | 72 | 2,774 | 33.0 | 27.1 | 1.29 |
| 17 | 1:9 | | 4,520 | 16.2 | 14.2 | |

Example 18

Epoxidation of copolymer.—In a 1-liter round-bottom flask equipped with a thermometer, stirrer, and condenser, 100 g. of a copolymer of 1,1,1-trichloro-2,3-epoxypropane and butadiene (1:1 molar ratio), prepared as described in the examples above, was dissolved in 100 ml. benzene, containing 2.8 g. sodium acetate. To this mixture 60 g. of a 40% peracetic acid solution was added dropwise during the course of ¾ hour, the temperature never exceeding 20° C. At the completion of the addition, the temperature was gradually increased to 30° C. and maintained for one hour. The reaction mixture was then washed with saturated water-salt solution until neutral. The benzene layer was then dried with anhydrous magnesium sulfate. The benzene was removed by vacuum distillation to yield 95 g. (94% yield) of white polymer having a molecular weight of 1037 by boiling point elevation in benzene and 55.7% chlorine. Titration analysis indicated 0.8% oxirane oxygen, 18% of theoretical.

Example 19

Epoxidation of copolymer.—In a 2-liter round-bottom flask equipped with a thermometer, stirrer, and condenser, 215 g. of a copolymer of 1,1,1-trichloro-2,3-epoxypropane (1:1 mole ratio) was dissolved in 250 ml. benzene and 9 g. sodium acetate as buffer was added. The mixture was cooled to 20° C. and 25–50 ml. increments of a 50% peracetic acid (total of 180 g.) were added. Very slight temperature exotherms were observed after each addition, which required 40 minutes. The mixture was heated by means of a water bath to 60° C. and maintained at this temperature for about three hours. At this time the benzene solution was cooled to room temperature and then washed with 2 liters of a 20% NaCl solution, followed by a water wash. The benzene solution was dried overnight with $MgSO_4$, filtered, and stripped of solvent. A 53% yield (114 g.) of white solid was isolated, softening point 55–65° C.; hydroxyl number 1.25%; oxirane oxygen 1.5%; 45.5% chlorine and a molecular weight of 1304.

Example 20

Crosslinking of copolymer.—A 2 g. sample of polychloroepoxy resin, made from a 1,3,3,3-trichloropropylene oxide and butadiene (1:1) copolymer and having the approximate formula:

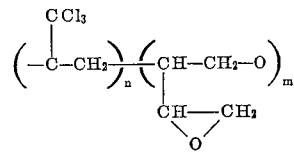

having a linear tetramethylene ether chain with repeating pendant epoxyethyl groups (formed from the corresponding product having pendant vinyl groups by reaction with sodium acetate buffered peracetic acid in benzene to convert 1.8% of the pendant vinyl groups to the oxirane group), the preparation of which is described in Example 18, was mixed with about 2 g. Versamid 115 (General Mills, a polyamide resin containing free primary and secondary amine groups). The two systems were compatible with each other. The mixture was heated on a steam bath for 30 minutes to yield a hard, crosslinked brown resin insoluble in organic solvents.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A polyhalogenous epoxy copolymer which is the reaction product of:
   (A) a copolymer comprised of
      (1) an alkylene oxide containing from 3 to 4 carbon atoms inclusive, and having an alkyl group attached to a carbon atom of the oxirane ring, said alkyl group having a maximum of 2 carbon atoms and containing at least 2 halogen atoms bonded to the same terminal carbon atom, and
      (2) an ethylenically-unsaturated compound having a plurality of polymerizable carbon-to-carbon double bonds; and
   (B) an epoxidizing agent, said copolymer being characterized by the presence of pendant alkyl groups having a maximum of 2 carbon atoms and at least 2 halogen atoms bonded to the same terminal carbon atom, and by the presence of pendant epoxy groups.

2. A copolymer according to claim 1, wherein said alkylene oxide (1) is 1,1-dichloro-2,3-epoxypropane.

3. A copolymer according to claim 1, wherein said alkylene oxide (1) is 1,1,1-trichloro-2,3-epoxypropane.

4. A copolymer according to claim 1, wherein said alkylene oxide (1) is 1,1,1-trichloro-3,4-epoxybutane.

5. A copolymer according to claim 1, wherein said ethylenically-unsaturated Compound 2 is butadiene.

6. A copolymer according to claim 1, wherein said ethylenically-unsaturated Compound 2 is isoprene.

7. A copolymer according to claim 1, wherein said ethylenically-unsaturated Compound 2 is chloroprene.

8. A copolymer according to claim 1, wherein said ethylenically-unsaturated Compound 2 is divinylbenzene.

9. A copolymer according to claim 1, wherein said epoxidizing agent (B) is peracetic acid.

10. A copolymer according to claim 1, wherein said epoxidizing agent (B) is an equilibrium mixture of hydrogen peroxide and acetic acid.

11. A copolymer according to claim 1, wherein said epoxidizing agent (B) is an organic peracid.

12. A copolymer according to claim 1, wherein said epoxidizing agent (B) is perbenzoic acid.

13. A copolymer according to claim 1, wherein said epoxidizing agent (B) is monoperphthalic acid.

14. A copolymer according to claim 1, wherein said epoxidizing agent (B) is peroxytrifluoroacetic acid.

15. A copolymer according to claim 1, where said epoxidizing agent (B) is metachloroperbenzoic acid.

16. A polyhalogenous epoxy copolymer which is the reaction product of (A) a copolymer comprised of (1), 1,1,1-trichloro-2,3-epoxypropane and (2) butadiene; and (B) peracetic acid, said copolymer being characterized by the presence of pendant alkyl groups having a maximum of two carbon atoms and having at least two halogen atoms bonded to the same terminal carbon atom, and by the presence of pendant epoxy groups.

17. A process for the production of a polyhalogenous epoxy copolymer which comprises reacting together:
    (A) a copolymer comprised of
        (1) an alkylene oxide containing from 3 to 4 carbon atoms, inclusive, and having an alkyl group attached to a carbon atom of the oxirane ring, said alkyl group having a maximum of 2 carbon atoms and containing at least 2 halogen atoms bonded to the same terminal carbon atom, and
        (2) an ethylenically-unsaturated compound having a plurality of polymerizable carbon-to-carbon double bonds; and
    (B) an epoxidizing agent, said copolymer being characterized by the presence of pendant alkyl groups having a maximum of 2 carbon atoms and having at least 2 halogen atoms bonded to the same terminal carbon atom, and by the presence of pendant epoxy groups.

18. A process according to claim 17, wherein said epoxidizing agent (B) is peracetic acid.

19. A process according to claim 17, wherein said epoxidizing agent (B) is an equilibrium mixture of hydrogen peroxide and acetic acid.

20. A process according to claim 17, wherein said epoxidizing agent (B) is an organic peracid.

21. A process according to claim 17, wherein said epoxidizing agent (B) is perbenzoic acid.

22. A process according to claim 17, wherein said epoxidizing agent (B) is monoperphthalic acid.

23. A process according to claim 17, wherein said epoxidizing agent (B) is peroxytrifluoroacetic acid.

24. A process according to claim 17, wherein said epoxidizing agent (B) is metachloroperbenzoic acid.

25. A process for the production of a polyhalogenous epoxy copolymer which comprises reacting (A) a copolymer comprised of (1) 1,1,1-trichloro-2,3-epoxypropane and (2) butadiene; with (B) peracetic acid, said copolymer being characterized by the presence of pendant alkyl groups having a maximum of two carbon atoms and having at least two halogen atoms bonded to the same terminal carbon atom, and by the presence of pendant epoxy groups.

26. A cured polyhalogenous epoxy copolymer which is the reaction product of:
    (A) an epoxidized copolymer prepared by reacting
        (1) a copolymer comprised of
            (a) an alkylene oxide containing from 3 to 4 carbon atoms inclusive, and having an alkyl group attached to a carbon atom of the oxirane ring, said alkyl group having a maximum of 2 carbon atoms and containing at least 2 halogen atoms bonded to the same terminal carbon atom, and
            (b) an ethylenically-unsaturated compound having a plurality of polymerizable carbon-to-carbon double bonds, and
        (2) an epoxidizing agent, with
    (B) a curing agent, said cured copolymer being characterized by the presence of pendant alkyl groups having a maximum of 2 carbon atoms and having at least 2 halogen atoms bonded to the same terminal carbon atom.

27. A cured copolymer according to claim 26, wherein said curing agent is a polyfunctional amine.

28. A cured copolymer according to claim 26, wherein said curing agent is an acid anhydride.

29. A cured copolymer according to claim 26, wherein said curing agent is a polyamide resin containing free primary and secondary amine groups.

30. A cured polyhalogenous epoxy copolymer which is the reaction product of (A) an epoxidized copolymer prepared by reacting (1) a copolymer comprised of (a) 1,1,1-trichloro-2,3-epoxypropane and (B) butadiene with (2) peracetic acid; and (B) a curing agent, said cured copolymer being characterized by the presence of pendant alkyl groups having a maximum of two carbon atoms and having at least two halogen atoms bonded to the same terminal carbon atom.

31. A process for the production of a cured polyhalogenous epoxy copolymer which comprises reacting:
    (A) an epoxidized copolymer prepared by reacting
        (1) a copolymer comprised of
            (a) an alkylene oxide containing from 3 to 4 carbon atoms inclusive, and having an alkyl group attached to a carbon atom of the oxirane ring, said alkyl group having a maximum of 2 carbon atoms and containing at least 2 halogen atoms bonded to the same terminal carbon atom, and
            (b) an ethylenically-unsaturated compound having a plurality of polymerizable carbon-to carbon double bonds, and
        (2) an epoxidizing agent; with
    (B) a curing agent, said cured copolymer being characterized by the presence of pendant alkyl groups having a maximum of 2 carbon atoms and having at least 2 halogen atoms bonded to the same terminal carbon atom.

32. A process according to claim 31 wherein said curing agent is a polyfunctional amine.

33. A process according to claim 31 wherein said curing agent is an acid anhydride.

34. A process according to claim 31 wherein said curing agent is a polyamide resin containing free primary and secondary amine groups.

35. A process for the production of a cured polyhalogenous epoxy copolymer which comprises reacting
    (A) an epoxidized copolymer prepared by reacting
        (1) a copolymer comprised of
            (a) 1,1,1-trichloro-2,3-epoxypropane and
            (b) butadiene with
        (2) peracetic acid; with
    (B) a curing agent, said cured copolymer being characterized by the presence of pendant alkyl groups having a maximum of two carbon atoms and having at least two halogen atoms bonded to the same terminal carbon atom.

References Cited

UNITED STATES PATENTS

| | | | |
|---|---|---|---|
| 2,829,131 | 4/1958 | Greenspan et al. | 260—83.7 |
| 2,829,135 | 4/1958 | Greenspan et al. | 260—96 |
| 2,951,829 | 9/1960 | Chiddix et al. | 260—2 |
| 3,044,999 | 7/1962 | Tousignant | 260—87.5 |
| 3,077,467 | 2/1963 | Gurgiolo | 260—94.2 |
| 3,135,705 | 6/1964 | Vandenberg | 260—2 |

JOSEPH L. SCHOFER, *Primary Examiner.*

D. K. DENENBERG, *Assistant Examiner.*

U.S. Cl. X.R.

260—860, 831, 2, 13, 47, 94.2, 94.3, 94.4, 88.5, 93.5, 93.1, 80, 94.7, 830; 117—124, 122; 252—65